US008341650B1

(12) United States Patent
Veerabhadraiah

(10) Patent No.: US 8,341,650 B1
(45) Date of Patent: Dec. 25, 2012

(54) HIGH THREAD COUNT ANALYZER FOR WEB APPLICATION SERVER ENVIRONMENT

(75) Inventor: Dharmaveera Veerabhadraiah, Dayton, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 506 days.

(21) Appl. No.: 12/698,619

(22) Filed: Feb. 2, 2010

(51) Int. Cl.
*G06F 3/00* (2006.01)
*G06F 9/44* (2006.01)
*G06F 9/46* (2006.01)
*G06F 13/00* (2006.01)
*G06F 11/00* (2006.01)
*G06F 15/173* (2006.01)

(52) U.S. Cl. ........ 719/320; 719/311; 719/313; 719/318; 714/1; 714/47.1; 714/47.2; 718/100

(58) Field of Classification Search ................ None
See application file for complete search history.

(56) References Cited

U.S. PATENT DOCUMENTS

| 2004/0128583 A1* | 7/2004 | Iulo et al. .................... 714/25 |
| 2005/0204342 A1* | 9/2005 | Broussard .................. 717/124 |
| 2005/0273456 A1* | 12/2005 | Revanuru et al. ............. 707/1 |

\* cited by examiner

*Primary Examiner* — Emerson Puente
*Assistant Examiner* — Jonathan R Labud

(57) ABSTRACT

Thread count analyzer programming enables automated monitoring of open process thread counts for a middleware web service, for example, in the context of Communication Enterprise Services (CCES) for providing customer account related notifications to customers/users of a mobile communications network. Web server thread counts are compared to first thresholds. In response to a high web server thread count, an impacted application server is identified, for example, by comparing application server thread counts to second thresholds. The procedure initiates a thread dump with regard to the impacted application server and provides notification to a support person together with information enabling access to a page of thread dump data. The exemplary thread count analysis can automatically detect a high thread count problem before there is an outage or any impact to the customer, accumulate relevant thread data, store such data in an accessible form, and provide automatic notice(s) for support personnel.

15 Claims, 10 Drawing Sheets

HIGH THREAD COUNT ANALYZER FOR WEB APPLICATION SERVER ENVIRONMENT

TECHNICAL FIELD

The present subject matter relates to techniques and equipment to monitor open process thread counts for a middleware web service, compare thread counts to one or more thresholds, identify an impacted application server, initiate a thread dump with regard to the application server and provide notification and a link to a page of thread dump data for a support person.

BACKGROUND

Many different enterprises run complex networks of servers to implement various automated communication functions to the enterprise. For example, as mobile wireless communications have become increasingly popular, carriers such as Verizon Wireless have customer communication systems to provide notifications of account related activities to their customers, for example as SMS messages to account holders' mobile stations, as emails, etc. Because of the large number of customers served by a major carrier, and the level of account activities, the volume of notification message traffic is quite large. To effectively provide such notifications, Verizon Wireless implemented its Customer Communication Enterprise Services (CCES) as an enterprise middleware web service.

At a high level, the CCES middleware comprises a web server layer and an application server layer. The architecture allows clients to send a request, for example for a notification, to a web server. The http web server then forwards the client request to one of a number of application servers. Each application server has multiple applications running on it. The application server determines the proper application to process the client request based on the context root of the client request. The application server processes the client request, in the CCES example, by sending one or more request messages to a back end system such as the Vision Billing System, MTAS, the SMS gateway and others, for example, to implement account activity and to initiate subsequent automatic notification thereof to the account holder. Once the application server has processed the request, a reply is then sent back to the web server which will then forward the reply back to the client.

In such an arrangement, the web server will keep a process thread open for each client request until the reply is sent back to the client from which the web server received the request. A problem occurs whenever any application server or backend process is slow. When this happens, the http web server starts creating new threads faster than it can close older threads, which causes the total number of threads to climb. Since an http server has the capacity to keep open only a finite number of threads, eventually the web server reaches its limit and an outage can occur.

It is fairly easy to monitor the number of open threads on an http server, but it is a challenge is to find out why there are a high number of threads. For example, each http server is shared by multiple applications. Thus if you know that a particular web server has a high number of threads open, you still do not know what application is causing the problem. Also, each http server sends the requests to two or more application servers in a round robin fashion. Thus, the support technician or system would not know the path of a request even if the http server that processed the request can be identified. Furthermore, often the slow down is caused by problems of one of the downstream backend systems, such as the Vision billing system, which the CCES support person does not have direct access to. Also, often the best way to diagnose a problem with a backend system is to perform a thread dump of the application that is having a problem. The thread dump provides an image of the open threads, for analysis by the support person. However, the thread dump must be done during the slowdown with the backend system in order to be effective. In a typical CCES example, each application server may have over twenty applications running on it. Since problems with backend systems can sometimes last only a few minutes, it is very challenging for a CCES support person to determine the correct application and run the thread dump while the problem is occurring.

These conditions or challenges create difficulties in pinpointing a problem, particularly in identifying the specific application on a server that is shared by multiple applications and identifying the specific server request path when the architecture is configured to distribute the load in a round robin fashion. There is no access to downstream systems such as the Vision billing system. Also, the short time window to perform any thread dumps in real time during a system slow down period.

Hence there is room for improvement in monitoring thread count in web server middleware systems, such as CCES, to address one or more of the above discussed challenges.

SUMMARY

The teachings herein provide improvements to web server middleware, for example to detect a problem before there is an outage or any impact to the customer, accumulate relevant thread data, store such data in an accessible form, and provide notice(s) for support personnel. Programming configures one or more computers to monitor open process thread counts, compare thread counts to thresholds, initiate action to identify an impacted application server, initiate a thread dump for that server and provide notification for a support person together with information enabling such a person to access a page of thread dump data.

For example, the detailed description teaches a technique for automated thread count analysis in a web application server environment. A script running on a web server counts the number of open processing threads active for each of a number of web server instances on the web server. The thread counts for the web server instances are compared to one or more first thresholds. For a web server thread count meeting or exceeding a first threshold, the technique entails automatically counting open processing threads active for each of a number of application servers involved in the processing of web server threads for the count meeting or exceeding the first threshold. The thread counts for the application servers are compared to one or more second thresholds, and an application server having an application server thread count meeting or exceeding a second threshold is automatically identified. A dump of thread related data with respect to applications running on a computer of the identified application server is converted to a page format and stored. One or more of the involved computers automatically sends a notification for at least one support person. The notification provides information to enable retrieval of the converted page of thread dump data.

In a specific example, the web environment provides CCES functions/services for a mobile network communication service provider, such as notifications to customers with respect to changes or other specific activity on customers' accounts. The support notification may be an email sent to at least one CCES support person. In such an example, the email provides (contains or links to a page containing) an http link for retrieval of one or more converted pages of thread dump data.

Other concepts relate to unique software for implementing the high thread count analysis and reporting techniques. A software product, in accord with this concept, includes at least one machine-readable medium and information carried by the medium. The information carried by the medium may be executable program code for the analyzer as well as data for the applicable count threshold(s). Other concepts relate to one or more hardware platforms programmed or otherwise configured so as to be able to implement the high thread count analysis and reporting functions.

By way of a specific example of a software implementation, the programming instructions might be embodied in at least one medium for execution by one or more computer, e.g. for loading of some of the programming into a web server and loading of other programming into one or more application severs. In such a specific example, the programming includes an initial script which, each time it is periodically started, implements counting of the number of open threads active for each of a plurality of web server instances. This script also enables a comparison of the web server thread counts to one or more first thresholds. In response to a web server thread count meeting or exceeding a first threshold, the script initiates a call to a server count script. When called, the server count script implements functions including: a determination of how many threads each of the application servers is using with respect to a web server thread count meeting or exceeding a first threshold; a comparison of each application sever thread count against at least one second threshold; identification of an application server having a thread count meeting or exceeding a second threshold; and a call to an analysis script for the identified application server. When called, the analysis script implements a dump of thread related data with respect to applications running on the identified application server. The programming also includes a process called by the analysis script, to convert output of the thread dump into a page format for retrieval.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The exemplary solution automates the process of determining the thread counts for each web server and comparing the counts to a list of thresholds. For application servers involved in processing for a web server count that is over threshold, the processing counts threads and compares application server thread counts to second thresholds. Identification of an application server having a high thread count triggers an analysis, such as a thread dump, and alerting technical service/support personnel. The alert provides access to retrieve relevant data, such as access to a link to retrieve a page created by conversion of thread dump data for an impacted application server.

The solution may be applied in the context of an enterprise middleware web service system. Although the thread count analyzer may be implemented in web service systems for other applications, one example of such a system is the Communication Enterprise Services (CCES) enterprise middleware web service for a mobile carrier's communication network of the type outlined earlier. To facilitate an understanding of such an application of the web count analysis technology, it may be helpful to first consider the network and CCES middleware web service in somewhat more detail.

Figure 1:
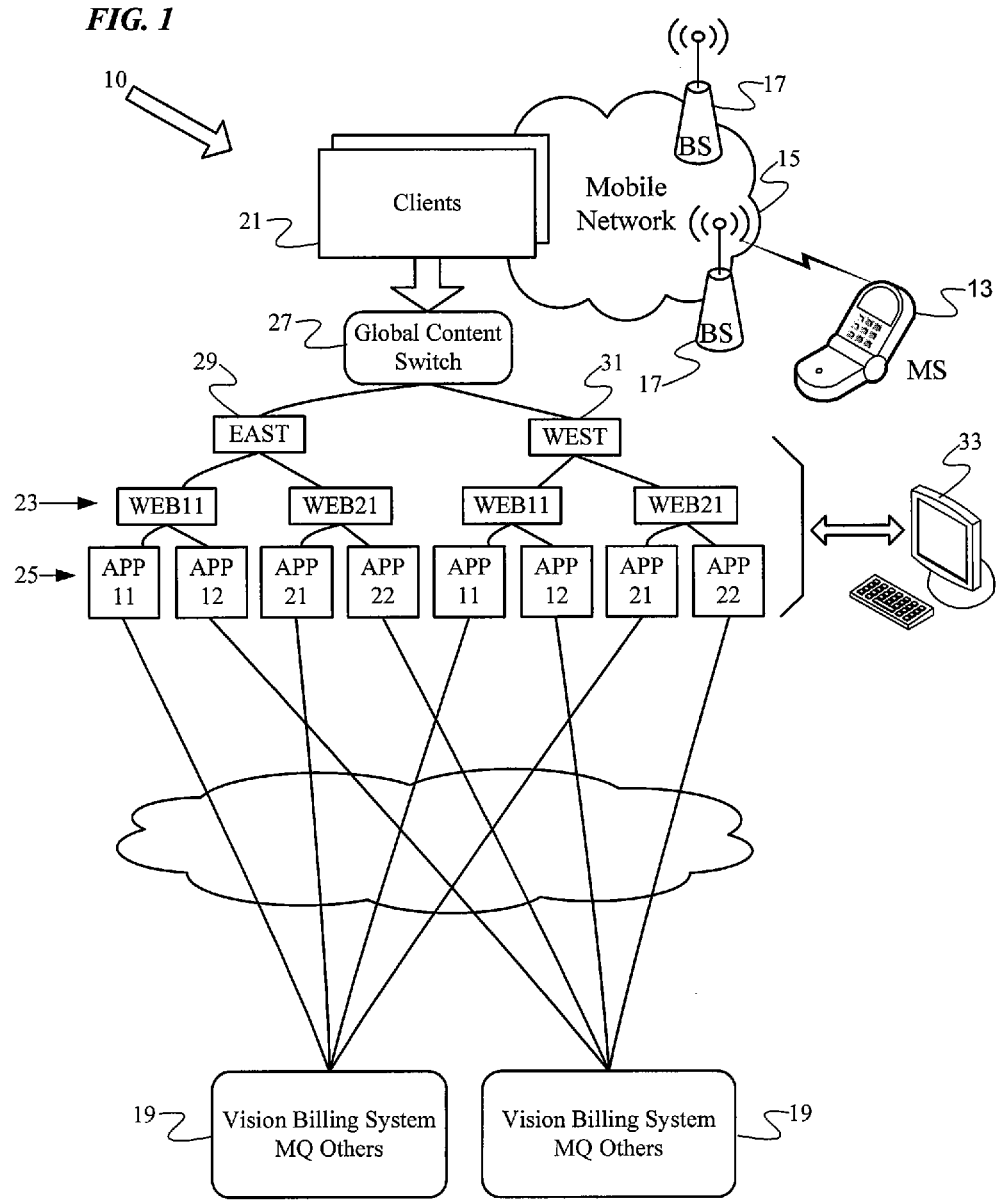
FIG. 1 is a high-level functional block diagram of a mobile carrier network and associated equipment for Customer Communication Enterprise Services (CCES), which may implement a web server thread count analyzer.

FIG. 1 illustrates a system 10 offering a variety of mobile communication services to users of any number of mobile stations. The example shows simply one mobile station (MS) 13 as well as general cloud representation of a mobile communication network 15. The network 15 provides mobile wireless communications services to any number of mobile stations 13, for example, via a number of base stations (BSs) 17. The network 15 generally may be any of a variety of available mobile networks, and the drawing shows only a very simplified example of a few elements of the network for purposes of discussion here. The network 15 allows users of the mobile stations such as 13 to initiate and receive telephone calls to each other as well as through the public switched telephone network or "PSTN" (not shown) and telephone stations connected to the PSTN. The network 15 typically offers a variety of other data services via the Internet, such as downloads, web browsing, email, etc.

The network allows Short Message Service (SMS) type text messaging between mobile stations and similar messaging with other devices via the Internet. Today, the network may offer one or more advanced mobile messaging services, such as enhanced messaging service (EMS) and/or multimedia messaging service (MMS). EMS is an application-level extension to SMS for cellular phones available on GSM, TDMA and CDMA networks. MMS is a mobile messaging type service that supports communications of messages carrying multimedia content, such as audio, picture and video content. Although EMS, MMS or another mobile messaging service may be used, CCES notifications in the web service example typically utilize SMS messages to the mobile stations 13 to provide various information from the carrier or service provider to its customers/users.

The system 10 also includes a number of systems operated by the carrier in support of its network services as well as platforms for Customer Communication Enterprise Services (CCES), implemented as an enterprise middleware web service, for example, to provide various messages to account holders or other mobile station users.

For example, the carrier will also operate a number of systems that provide ancillary functions in support of the communications services provided through the network 10, and those elements communicate with other nodes/elements of the network 10 via one or more private IP type packet data networks (sometimes referred to as an Intranet—not shown). The support elements, for example, include one or more systems of record, such as a Vision Billing System, which includes subscriber account records. In the context of the CCES customer notification functions implemented via the web service, the system 19 is a backend system. Backend systems of the CCES service may include Vision, MTAS, SMS gateway and others. The backend systems shown at 19, for example, implement account activity and/or provide automatic notification thereof to the account holder.

With regard to the customer notifications implemented via CCES, a number of the carrier's systems appear as clients 21 to the CCES service. For example, today, the carrier will also offer its subscribers on-line access to a variety of functions related to the subscribers' accounts, such as review of billing statements and usage data, on-line payment, subscription changes, password control or the like. For that purpose, the carrier in our example may operate a customer account web server, offering a 'My Account' type subscriber interface via the Internet. Hence, a user's terminal, such as PC (not shown), may be used to access on-line information about a subscriber's account, which the mobile carrier makes available via the carrier's My Account web site accessible through the Internet. For example, the web site provides secure user access to enter and/or otherwise change various aspects of the subscriber's account related information. The website also may allow the subscriber to designate the MDN for the account holder's mobile station 13, e.g. for certain customer notifications.

At a high level, the web site may be considered as one of the clients 31 of the CCES web service. Hence, it may be helpful to consider a high-level discussion of an example of an account change and notification, including how the CCES services might appear from the user or subscriber's point of view. Assume now that the subscriber has an account with the carrier operating the mobile network and has access to account related functions/services through My Verizon, via the Internet and the client platform 21 that offers the web site. The subscriber may use the PC (or web enabled mobile station 13, etc.) to log-in via the site offered by the client platform 21 (although it appears as a website server to the customer terminal device). In this example, the subscriber would enter a username and a password to log onto their own account page at the carrier's website, after which, the subscriber can then enter new data and/or revise existing account data via the account page.

Upon completion of the subscription change, billing address for example, the client 21 needs to communicate with other network systems, for example, to store the new address information in one or more of systems of record, e.g. a back-end Vision Billing System. The web site client also requests transmission of one or more notifications to the customer or other users associated with the account, to advise them of the recent account activity, which entails SMS message transmission via an SMS gateway, another example of a backend system. At least the notification request goes to the CCES.

CCES services, in the example, are implemented using instances of the IBM WebSphere Application Server (WAS). Websphere is a software product for integrating electronic business applications across multiple computing platforms, using Java-based Web technologies. The Websphere implementation offers a readily scalable distributed architecture. In such an implementation, there a multiple web servers 23, and each web server communicates with applications running on a number of associated application servers 25.

At a high level, the CCES middleware consists of servers that comprise the web server layer and the application layer. The architecture allows clients 21 to send a request to a global content switch that then sends the request to a web server 23 that will then route the request to an application server 25. The application server 25 then sends the request to a backend system 19 such as the Vision Billing System, the SMPP gateway, MQ and others. A reply is then sent back to the client 21.

Figure 2:
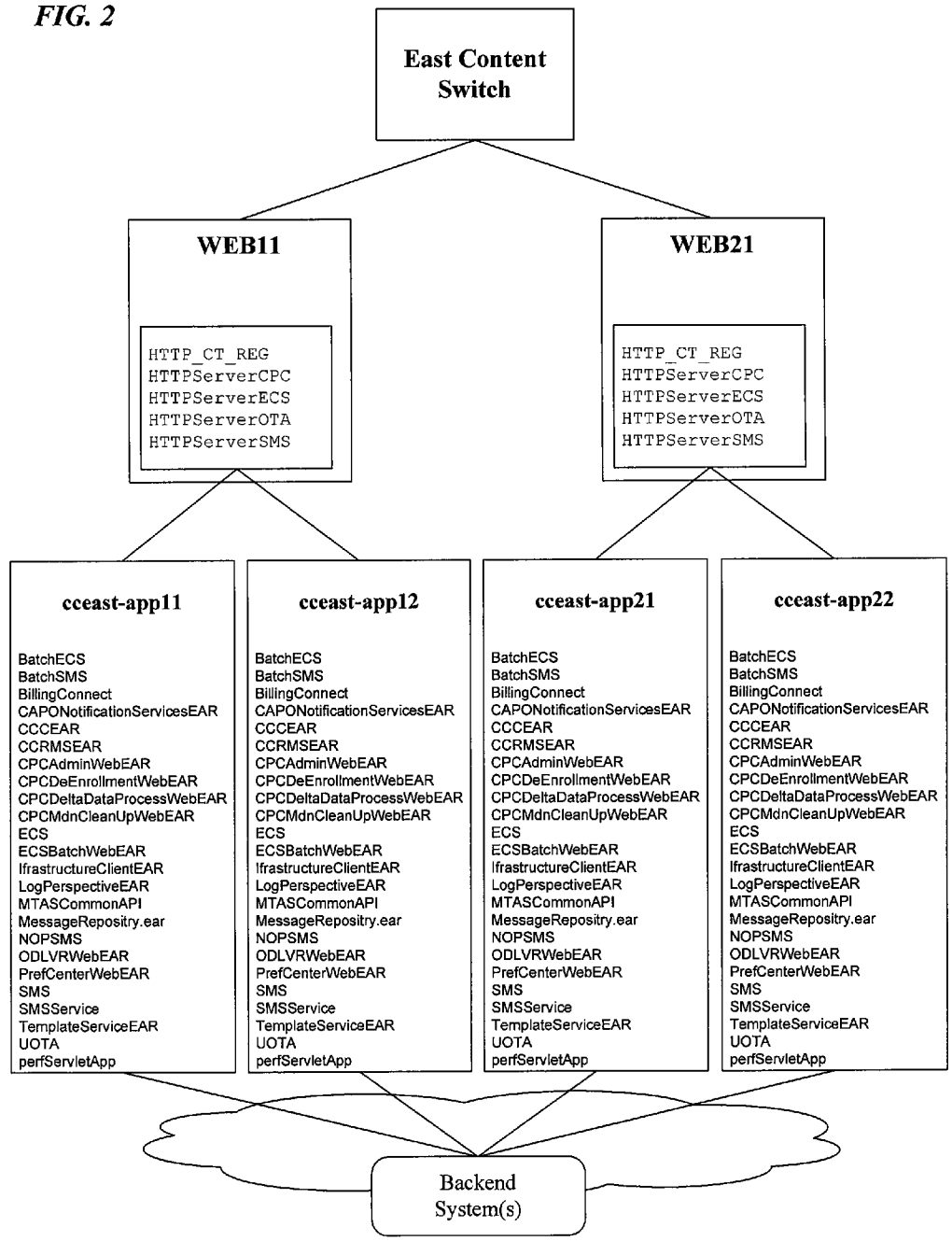
FIG. 2 is a high-level functional block diagram of a portion of the web application server environment, implementing the CCES functions in the system of FIG. 1.

In the example, there is one global content switch 27 and two regional (one east one west) content switches 29, 31 to distribute the traffic. The CCES systems in the example include two web servers (WEB11 and WEB21) associated with each regional content switch. For simplicity, the example shows two application servers associated with each web server. A pair of application servers APP11 and APP12 are associated with each web server WEB 11, and a pair of application servers APP21 and APP22 are associated with each web server WEB21. Those skilled in the art will appreciate that this is a relatively simply example, and that an actual implementation may include more content switches, web servers and application servers. By way of an example, FIG. 2 shows the East elements in somewhat more detail, including the East content switch, the East web servers (WEB11 and WEB21) as well as the associated application servers (there referred to as cceast-app11, cceast-app12, cceast-app21, and cceast-app22). Maintenance or support personnel have access to the servers 23, 25 via networks (not shown) and appropriate user terminal devices, represented by the exemplary terminal 33.

The CCES middleware structure is setup so that the global content switch 27 will accept a request from a client and route that request to one of the regional content switches, that is to say in our example, either to the East content switch 29 or the West content switch 31 depending on where the request came from. The content switch then forwards the request to one of two different web servers, selected in a round robin fashion to distribute the processing load.

In the example, each UNIX web server has 5 http server instances running on it, although there may be a smaller or larger number of http server instances running on each web server platform. As shown by way of example in FIG. 2, each of the web servers WEB11 and WEB21 runs http servers: HTTP_CT_REG, HTTPServerCPC, HTTPServerECS, HTTPServerOTA and HTTPServerSMS. In the example, the East or West content switch determines which of these 5 http processes within the particular server platform WEB 11 or WEB21 to forward the request to, based on the context root of the request.

Upon receipt of a client request, the http server forwards the client request to one of two UNIX application servers, which it selects in a round robin fashion. Each UNIX application server has multiple applications running on it (see lists in the cceast-app servers in FIG. 2, by way of example). The UNIX application server then determines the proper application to process the request based on the context root of the request.

In the CCES example of FIG. 1, the application server processes the request by sending one or more requests to a backend system 39, such as the Vision Billing System, MTAS, the SMS gateway and others, for example, to implement account activity and to initiate subsequent automatic notification thereof to the account holder for example via SMS to the subscriber's mobile station 13. Once the application server has processed the request, a reply is then sent back to the web server which will then forward the reply back to the client.

In an arrangement like that of CCES (FIG. 1), the web server will keep a thread open for each request until the reply is sent back to the client. A problem occurs, however, if an application server or backend process is slow, because the http web server starts creating new threads faster than it can close them causing the total number of threads to climb. If unchecked, since an http server has the capacity to keep open only a finite number of threads, eventually the web server reaches its limit and an outage can occur.

Figure 3:
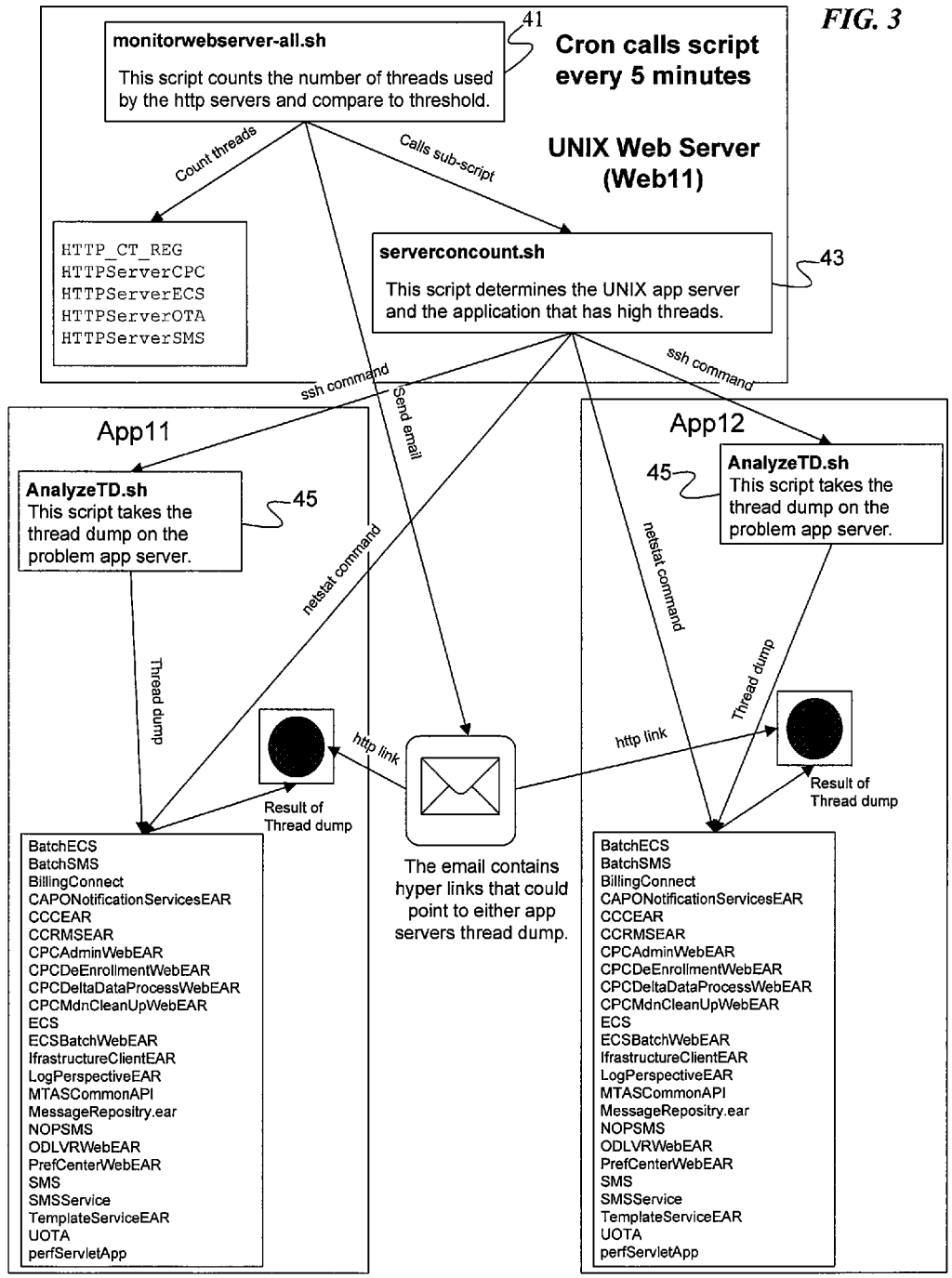
FIG. 3 is a flow chart of an example of a process for analyzing open thread counts, on the servers of FIGS. 1 and 2, and providing notifications with links to pages of report data.
Figure 4:
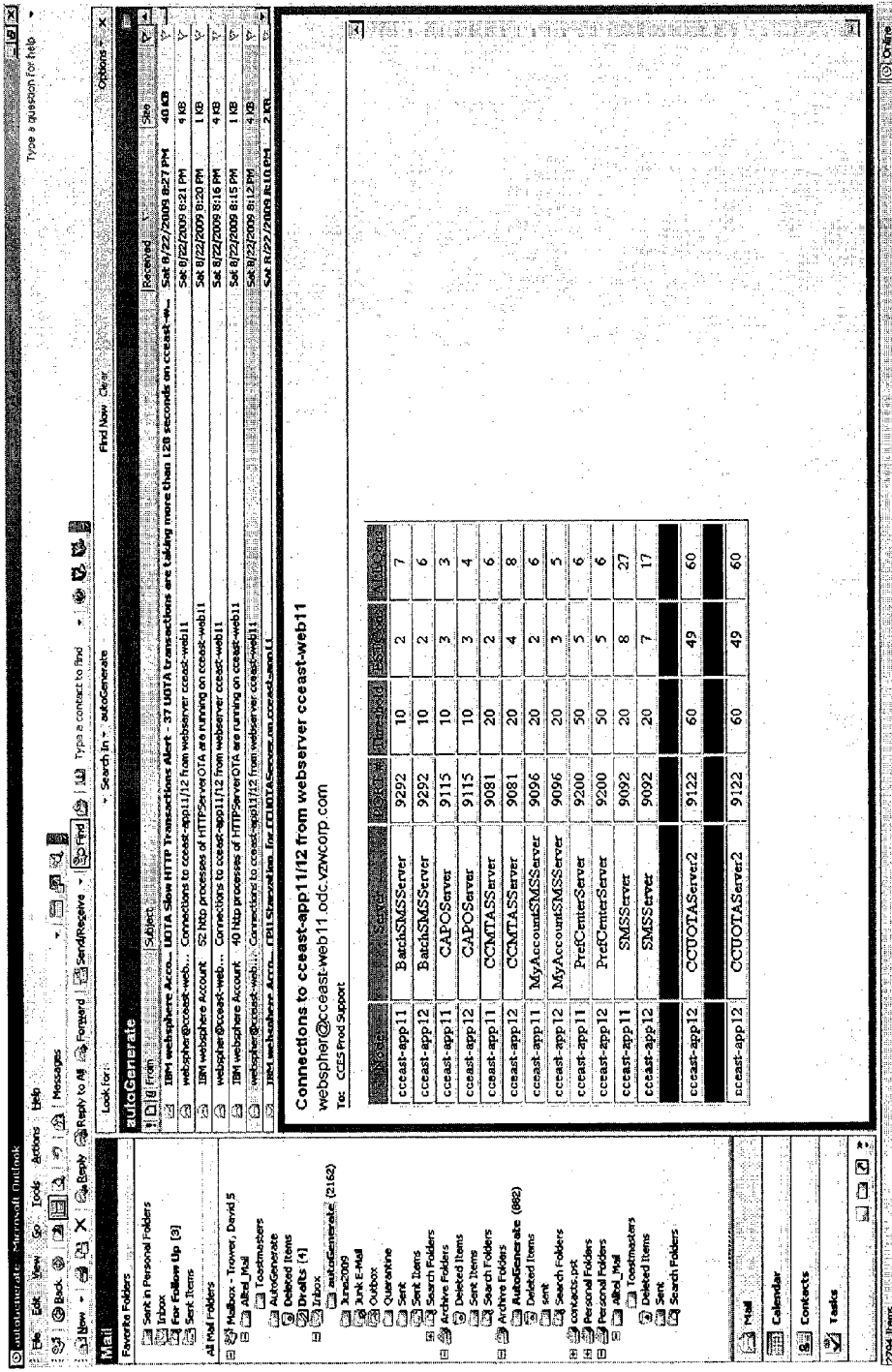
FIG. 4 is a screen shot of an example of a notification email.

FIG. 3 is a flow chart of an example of the processing involved in the thread count analysis and reporting solution, as may be implemented in the context of CCES in the system outlined above relative to FIGS. 1 and 2. At a high level, thread count analyzer programming enables the web server system to determine the thread counts for each http server and compare the counts to a list of thresholds. If a thread count exceeds a particular threshold, then the delinquent application is found automatically and a thread dump is immediately performed with respect to that application. A page is then sent to CCES Production support and an e-mail is also sent. The e-mail contains the names of the application servers, the number of open threads, the threshold, and provides information to access an http link to the thread dump analysis. FIG. 2 shows an example of such an email report.

This process can detect the problem before there is an outage or any impact to the customer. Since the program runs every 5 minutes 24 hours a day, in our CCES example, it detects the high thread count problem quickly. The prior process of determining the correct application server by running commands by hand is complicated, time consuming and error prone. It also requires the support person to login to multiple UNIX machines. The analysis script is much faster than a person and this is very important since the thread dump must be taken during the slowdown.

The script also notifies the support person by page. This allows the support person to be working on something else until the problem occurs. Once the support person is paged, they will check their e-mail inbox for the html e-mail. The thread dump and log files are placed in a directory where the application server can display the results to a web browser. This allows the support person to look at the thread dump and logs by simply following the hyperlinks in the e-mail without having to login to any UNIX server. The logs and thread dump file names can be unique since they are based on the date and time. This means that if the problem occurs multiple times all thread dumps and log files are preserved.

From an email like that of FIG. 2, the CCES support person can see that two applications servers are over the threshold, in this example. Each highlighted line relates to the cceast-app11 node CCUOTAServer, indicating high threshold. The server item in each highlighted line, CCUOTAServer in the example, is a link to a page accessible via a browser. The highlighted lines also shows the port number (e.g. 9121), the threshold (e.g. 60), and the relevant counts of connections or threads, ESTCons (e.g. at 531) and AllCons (e.g. at 532).

Figure 5:
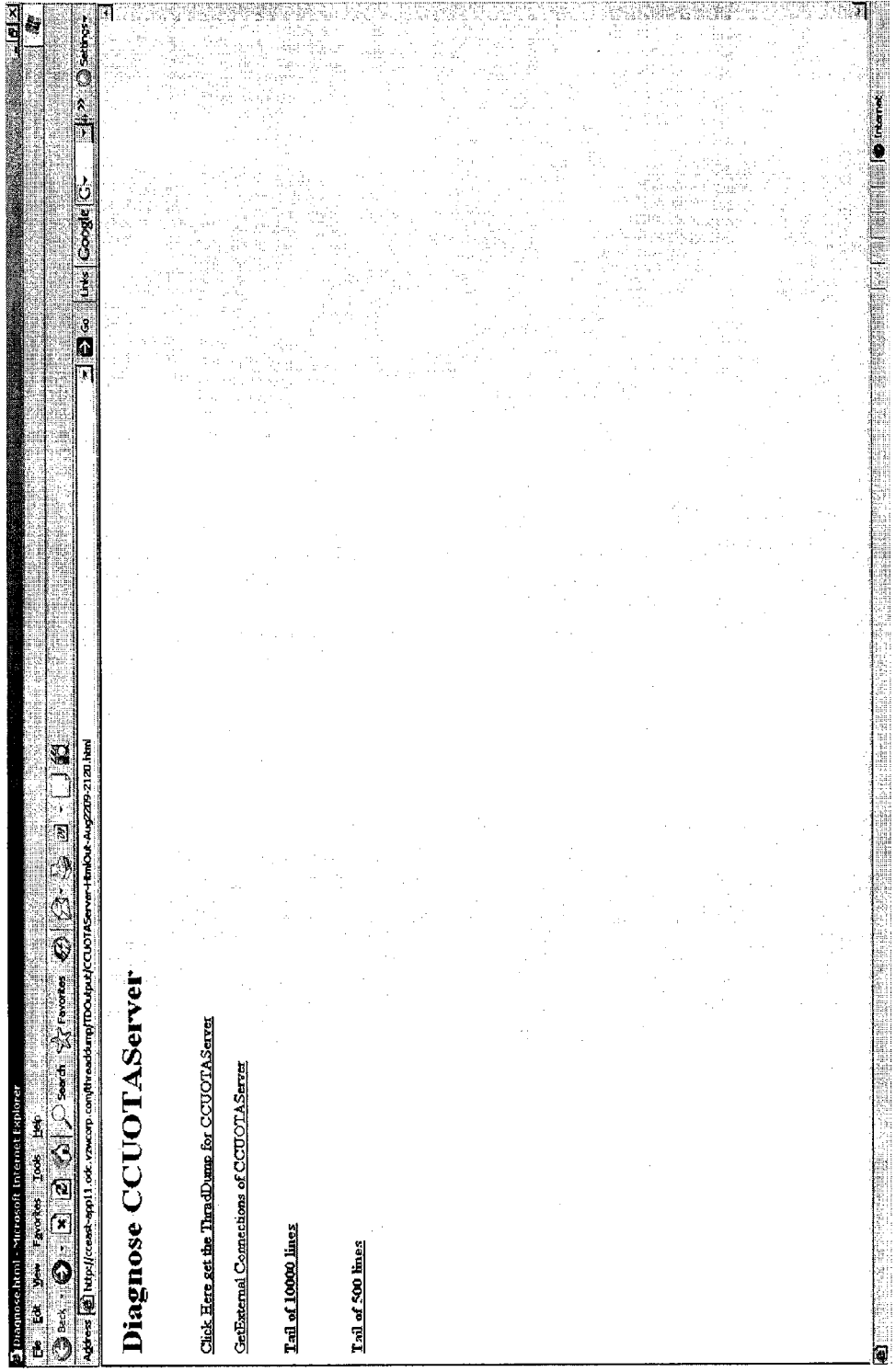
FIG. 5 is a screen shot of an example of an intermediate page, for an over count application server identified in the email, showing a link to a thread dump page and a link to a page showing external connections for an impacted application server.
Figure 6:
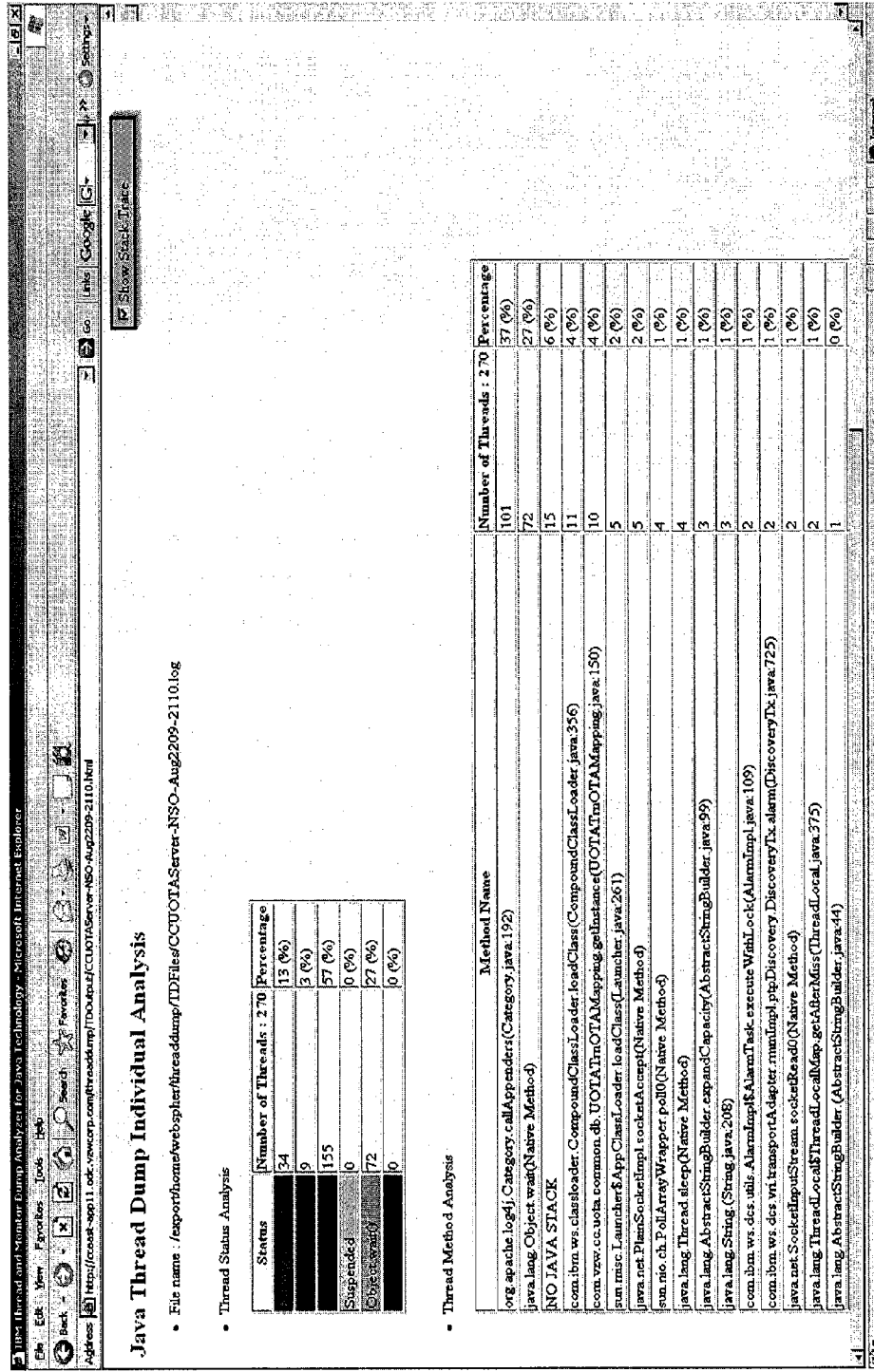
FIG. 6 is a screen shot of an example of a portion of the page of data derived from the thread dump regarding an application server exhibiting one or more application thread counts at or exceeding applicable threshold(s).

Now the CCES support person would click on the http link for CCUOTAServer. This brings up a page like that seen in FIG. 5. From that page, the CCES support person would now click on the http link for the Thread Dump. FIG. 6 is an example of the subsequent summary of the thread dump. In the illustrated example, the CCES support person can see that the log4j process is using up 37% of the threads. The intermediate page (FIG. 5) may also provide a link to a page showing number of external connections to the server.

In an exemplary implementation of the thread count analysis, a procedure like that of FIGS. 1-4 is controlled by three or four scripts and a java process. FIG. 3 shows the scripts on various servers as well as the flow/interaction between the scripts. The main script is called monitorwebserver-all.sh 14, and it is run every 5 minutes by a cron routine of the web server. Cron is a time-based job scheduler that allows the UNIX operating system to automatically run jobs at a certain time.

Figure 7:
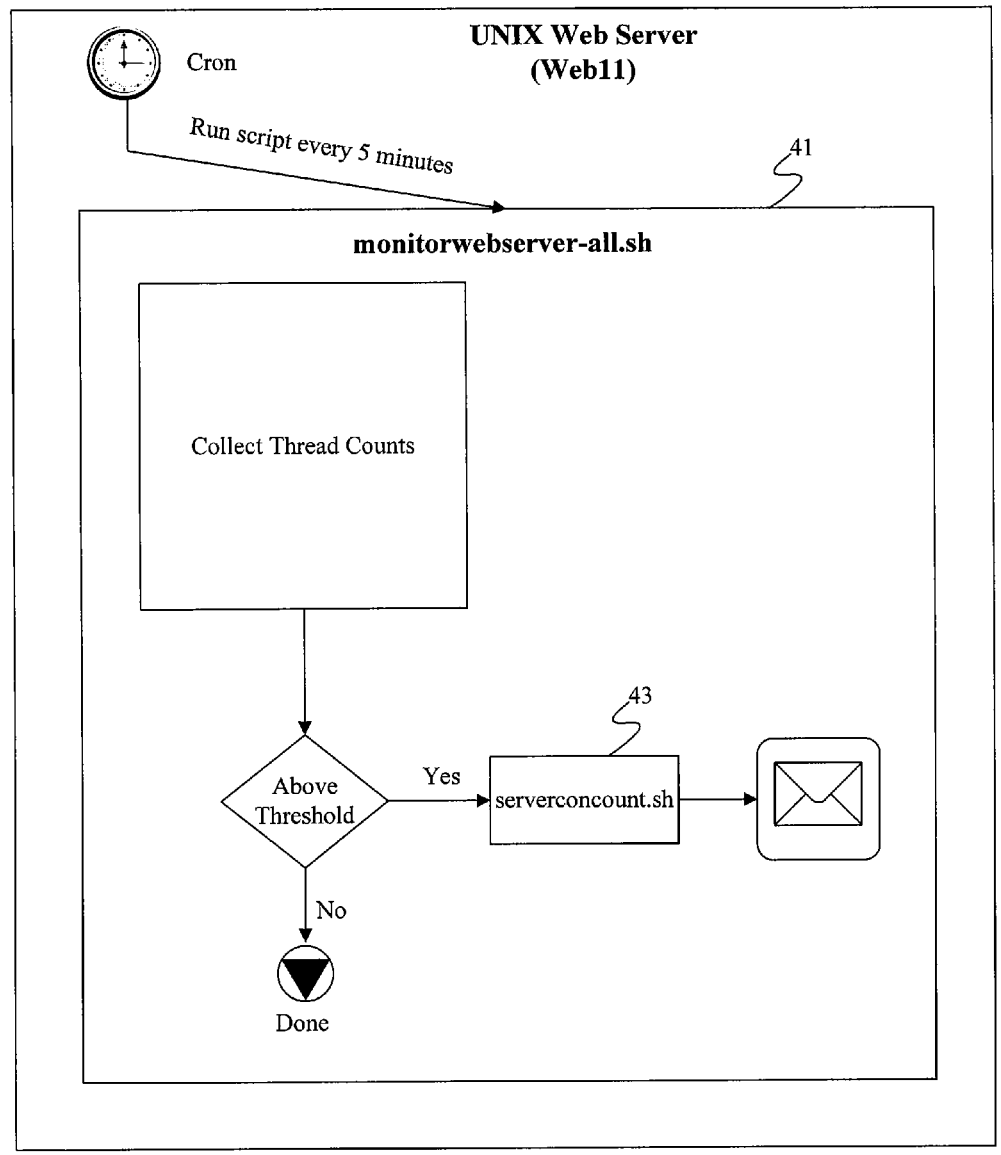
FIG. 7 is a simple flow chart illustration of examples of some of the programs for the thread count analysis, as may run on one of the web servers in the system of FIGS. 1 and 2.

The monitorwebserver-all.sh script 41 is the starting script for the thread count analysis. As shown in the flow chart of FIG. 7, execution of this first script 41 causes the computer platform implementing the particular web server to collect counts of open threads on the web server, that is to say for the various instances running on the server platform. The monitorwebserver-all.sh script 41 also implements a comparison of the web server thread counts to a list of first thresholds. If the number of open threads is above the threshold, a page is sent out to CCES support staff and the script serverconcount.sh 43 is called. Among its functions, the script serverconcount.sh 43 will eventually cause the web server to output the e-mail to CCES support staff as outlined above.

Figure 8:
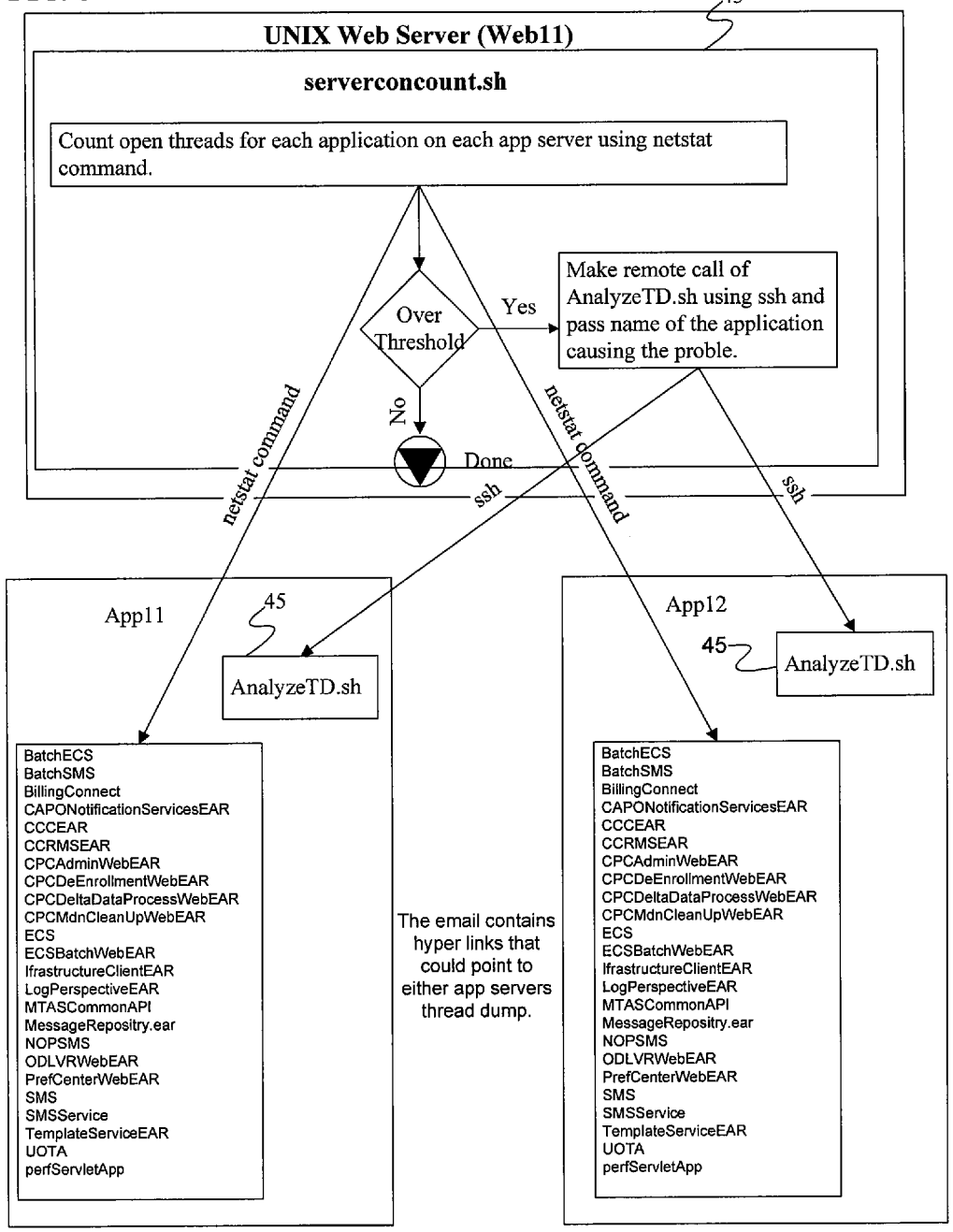
FIG. 8 depicts functions/flows in somewhat more detail, in relation to the application server programs, as may run on one of the web servers as well as the related analysis program as may run one each of the application servers.

However, before sending the email, the script serverconcount.sh 43 initiates actions to identify one or more of the application servers associated with the particular web server, which are involved activities/processes in the detected high web server thread count. For that purpose, the script 43 (FIG. 8) counts the number of open threads for each of the application servers and compares the application sever thread counts against second thresholds. In this way, the execution of the script serverconcount.sh 43 enables the computer platform running the web server to identify one or more application servers having a thread count meeting or exceeding a second threshold. For each application server having a high thread count, the script serverconcount.sh 43 triggers a call of an analysis script 45 for the identified application server.

Figure 9:
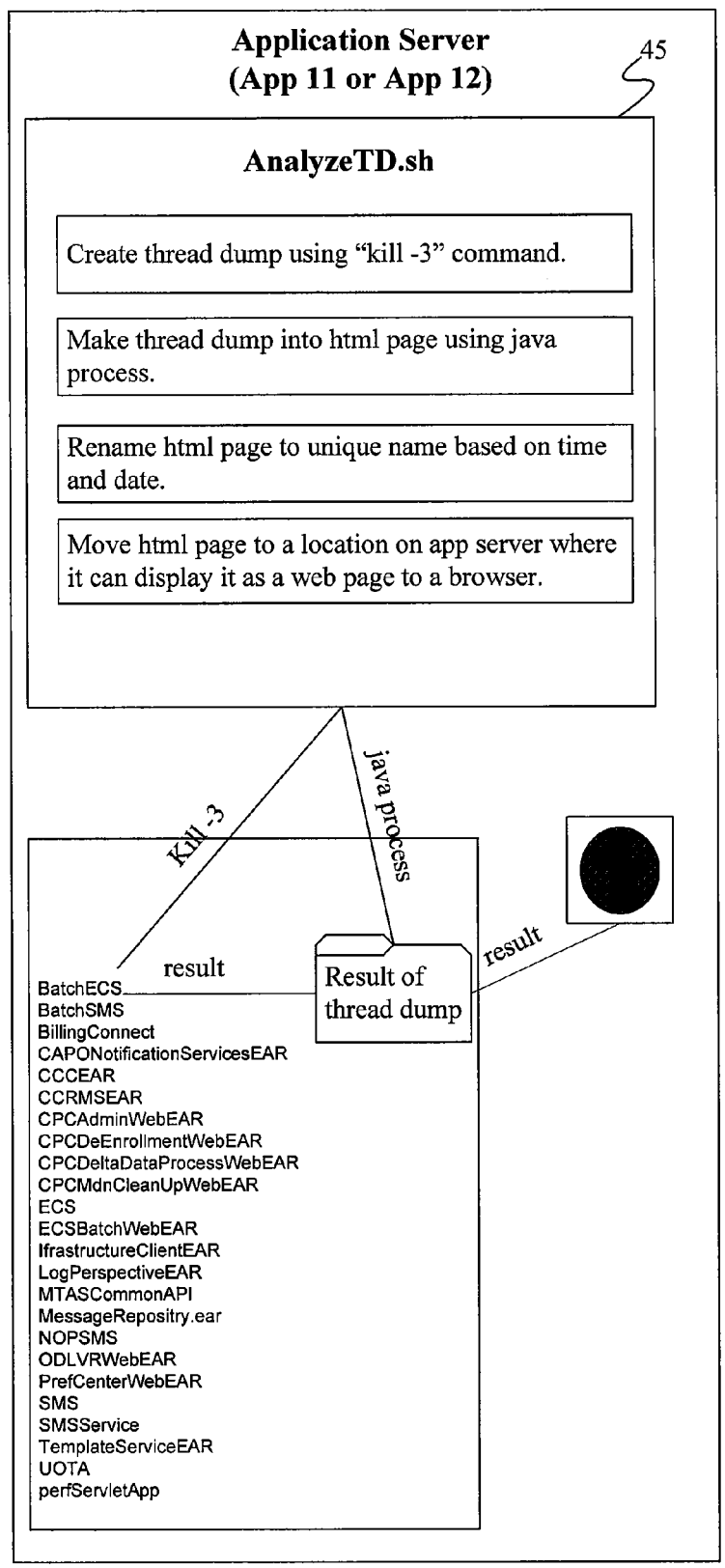
FIG. 9 depicts functions/flows of programming running on one of the application servers in the system of FIGS. 1 and 2, including aspects of a thread analysis program for the application server.

If the number of threads for an application server is above the threshold, then the AnalyzeTD.sh script 45 controls the responsive action, e.g. the thread dump. The AnalyzeTD.sh script 45 runs on each application server (see FIG. 9). This script is called from the web server by the command ssh. This script 45 takes the thread dump on the process that is having a problem by the UNIX command "kill-3" run on the process. This script then calls the java process jca14.jar. The jca14.jar program implements a java process that is called by AnalyzeTD.sh, to take the output of the thread dump and turn it into an html page for presentation to the support person. The AnalyzeTD.sh script 45 then places the output in a place where the application server can display the HTML page of thread dump data that was just created.

Although not shown, a countexternalconn.sh script also may be provided. This script is called by AnalyzeTD.sh script. If provided, it causes the application server to count the number of established connections to the external systems. The AnalyzeTD.sh script 45 then places the output in a place where the application server can display the HTML page of external connection data. Link information for the HTML report page(s) is provided to the serverconcount.sh script for use in generating the email and/or intermediate page.

As shown by the above discussion, functions relating to the monitoring and analyzing the application thread counts and alerting a support person may be implemented on computers connected for data communication via the components of a packet data network as shown in drawings such as FIGS. 1 to 3. Although special purpose devices may be used, such devices also may be implemented using one or more hardware platforms intended to represent a general class of data processing device commonly used to run server and application programming so as to implement the thread count analyzer functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the thread count analyzer programming as well as associated stored data, e.g. files used for the thresholds and or to direct the paging, email and other report messages. The software code is executable by the general-purpose computer that functions as the web server, application server(s) and/or that functions as a technician's terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to determine the thread counts for each respective server and compare the counts to the appropriate lists of thresholds and provide the alerts and thread dump report pages, in essentially the manner performed in the implementations discussed and illustrated herein.

Figure 10:
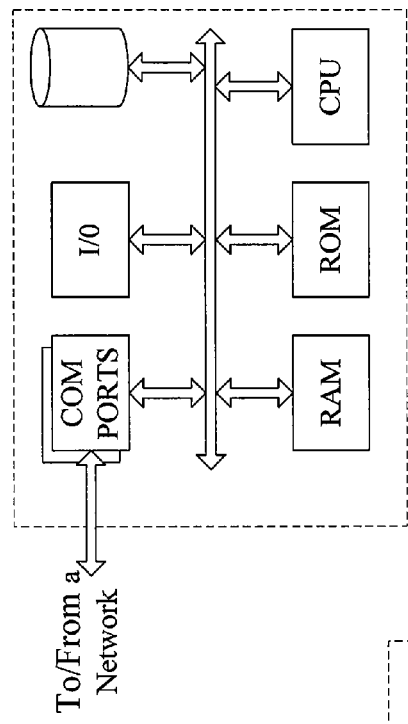
FIG. 10 is a simplified functional block diagram of a computer that may be configured as a host or server, for example, to function as any of the web or application servers in the system of FIG. 1.
Figure 11:
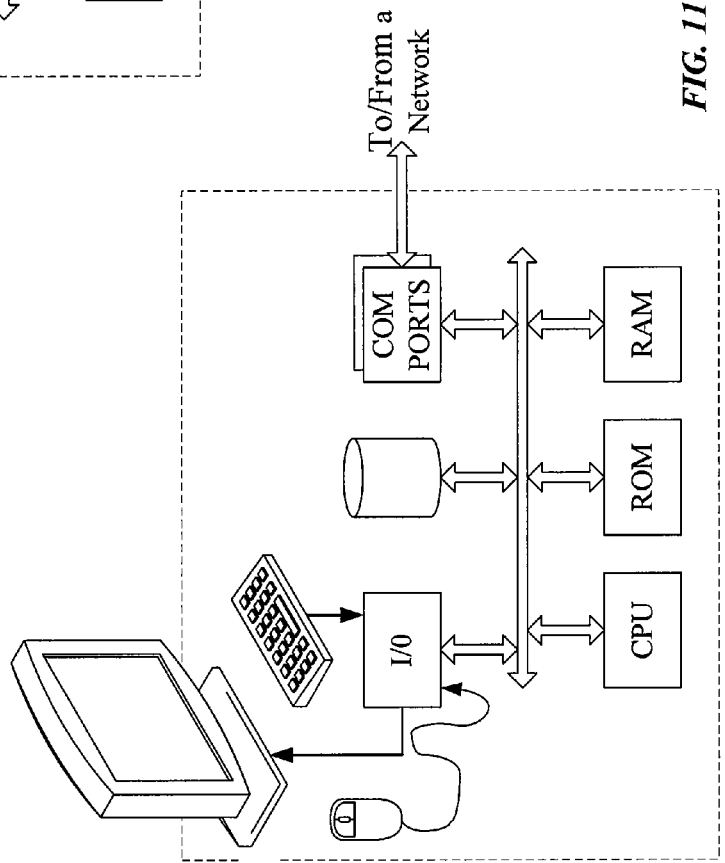
FIG. 11 is a simplified functional block diagram of a personal computer or other work station or terminal device, such as that for a CCES staff person to receive an email notification of retrieving report pages such as for thread dump data.

FIGS. 10 and 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, the server functions may be implemented in a distributed fashion on a number of similar platforms, to distribute the processing load Hence, aspects of the methods of to determine analyze thread counts and provide notices and reports, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of a web server and platforms of the associated application servers that will implement the monitoring, etc. of the thread count analyzer. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of thread count analysis in a web application server environment, comprising steps of:

on a computer of a web server, automatically counting number of open processing threads active for each of a plurality of web server instances on the web server;

on the computer, comparing the web server thread counts for the plurality of web server instances to one or more first thresholds;

in response to a web server thread count meeting or exceeding a first threshold, automatically counting open processing threads active for each of a plurality of application servers involved in the processing of web server threads for the count meeting or exceeding the first threshold;

automatically comparing the application web server thread counts for each of the application servers to one or more second thresholds;

automatically identifying an application server having an application server thread count meeting or exceeding a second threshold;

implementing a dump of thread related data with respect to applications running on a computer of the identified application server;

converting data from the thread dump to a page format and storing the page; and automatically sending from one of the computers a notice for at least one support person providing information to enable retrieval of the converted page of thread dump data.

2. The method of claim 1, wherein:

the step of sending the notice comprises automatically sending an email for the at least one support person, and the email provides information for accessing an http link for the retrieval of the converted page of thread dump data.

3. The method of claim 2, further comprising:

determining number of external connections to the identified application server; and storing data regarding the number of external connections to the identified application server;

wherein the email further provides information for accessing an http link for retrieval of data regarding the number of external connections to the identified application server.

4. The method of claim 1, wherein the web services application server environment implements Customer Communication Enterprise Services (CCES) for a mobile network communication service provider.

5. The method of claim 4, wherein:

the web server receives requests from and provides responses to one or more systems of the mobile network communication service provider each acting as a client with respect to the CCES; and the applications running on the identified application server process received requests and generate responses.

6. The method of claim 5, wherein at least some of the applications running on the identified application server provides communications for the CCES with backend systems of the mobile network communication service provider for servicing client requests.

7. The method of claim 6, wherein each application server is a Websphere Application Server (WAS).

8. An article of manufacture, comprising:

at least one machine readable storage medium; and programming instructions embodied in said at least one medium for execution by one or more computers, wherein the programming configures said one or more computers to be capable of performing functions for thread count analysis in a web application server environment, the functions comprising:

automatically counting number of open processing threads active for each of a plurality of web server instances on the web server;

comparing the web server thread counts for the plurality of web server instances to one or more first thresholds;

in response to a web server thread count meeting or exceeding a first threshold, automatically counting open processing threads active for each of a plurality of application servers involved in the processing of web server threads for the count meeting or exceeding the first threshold;

automatically comparing the application web server thread counts for each of the application servers to one or more second thresholds;

automatically identifying an application server having an application server thread count meeting or exceeding a second threshold;

implementing a dump of thread related data with respect to applications running on a computer of the identified application server;

converting data from the thread dump to a page format and storing the page; and automatically sending a notice for at least one support person providing information to enable retrieval of the converted page of thread dump data.

9. The article of claim 8, wherein:

the function of sending the notice comprises automatically sending an email for the at least one support person, and the email provides an http link for retrieval of one or more converted pages of thread dump data.

10. The article of claim 8, wherein the programming comprises:

one or more scripts for execution on a computer of the web server; and one or more programs for execution on a computer of each application server.

11. The article of claim 10, wherein the one or more scripts for execution on a computer of the web server include:

(a) a first web server script for configuring the web server to implement the functions of counting number of open processing threads active for each of the web server instances on the web server and comparing the web server thread counts for the plurality of web server instances to one or more first thresholds; and (b) a second web server script for automatically comparing the application web server thread counts for each of the application servers to one or more second thresholds, and automatically identifying an application server having an application server thread count meeting or exceeding a second threshold.

12. The article of claim 11, wherein the one or more programs for execution on a computer of each application server include:

(a) an application server script for initiating the dump of thread related data with respect to applications running on the application server; and (b) an application server process for the converting data from the thread dump to a page format.

13. An article of manufacture, comprising:

at least one machine readable storage medium; and programming instructions embodied in said at least one medium for execution by one or more computers, wherein the programming configures said one or more computers to be capable of performing web server thread count analyzer functions, and the programming comprises:

an initial script which, each time it is periodically started, implements: counting of the number of open threads active for each of a plurality of web server instances; comparison of the web server thread counts to one or more first thresholds; and in response to a web server thread count meeting or exceeding a first threshold, calling a server count script;

the server count script which when called implements: a determination of how many threads each of a plurality of application servers is using with respect to a web server instance having the thread count meeting or exceeding a first threshold; a comparison of each application sever thread count against one or more second thresholds; identification of an application server having a thread count meeting or exceeding a second threshold; and a call of an analysis script for the identified application server;

the analysis script which when called implements a dump of thread related data with respect to applications running on the identified application server; and a process called by the analysis script to convert output of the thread dump into a page format for retrieval.

14. The article of claim 13, wherein:

the initial script and the server count script are configured for execution on one or more computers of the web server; and the analysis script and programming for the conversion process are configured for execution on one or more computers of the identified application server.

15. The article of claim 14, wherein:

the programming for the conversion process is configured to provide a link for the page of converted thread dump data, for retrieval of the page from storage; and the server count script is configured to generate a notification email for at least one support person, the email providing access to a link to enable retrieval of the converted page of thread dump data.

* * * * *